United States Patent [19]

Siadat et al.

[11] Patent Number: 4,710,539
[45] Date of Patent: Dec. 1, 1987

[54] HEAT ACTIVATABLE ADHESIVE OR SEALANT COMPOSITIONS

[75] Inventors: Bahram Siadat, Boxborough, Mass.; Charles R. Morgan, Brookeville, Md.

[73] Assignee: W. R. Grace & Co., New York, N.Y.

[21] Appl. No.: 487,563

[22] Filed: Apr. 22, 1983

Related U.S. Application Data

[63] Continuation-in-part of Ser. No. 317,672, Nov. 2, 1981, abandoned.

[51] Int. Cl.$^4$ ............ C08F 210/18; C08F 212/08; C08F 218/08; C08F 220/18
[52] U.S. Cl. ............ 525/59; 525/259; 525/260; 525/263; 525/266; 525/426
[58] Field of Search ............ 525/57, 59, 259, 260, 525/263, 266, 426

[56] References Cited

U.S. PATENT DOCUMENTS

| | | | |
|---|---|---|---|
| 2,773,050 | 12/1956 | Caldwell et al. | 525/58 |
| 4,169,088 | 9/1979 | Hansen | 525/57 |
| 4,194,955 | 3/1980 | Nowak et al. | 525/59 |
| 4,274,992 | 6/1981 | Buechler et al. | 525/44 |
| 4,419,487 | 12/1983 | Rowe | 525/44 |

FOREIGN PATENT DOCUMENTS 25135  10/1972  Japan ............ 525/58

*Primary Examiner*—John C. Bleutge
*Assistant Examiner*—Robert E. L. Sellers, II
*Attorney, Agent, or Firm*—Richard P. Plunkett; William W. McDowell, Jr.

[57] ABSTRACT

A heat activatable adhesive or sealant organic resin composition comprising (1) a liquid, ethylenically unsaturated monomer, oligomer or prepolymer of the formula:

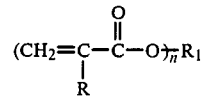

wherein R is H or CH$_3$, R$_1$ is an organic moiety and n is at least 2, (2) a thermal initiator selected from the group consisting of substituted or unsubstituted pinacols, azo compounds, thiurams, organic peroxides and mixtures thereof, and (3) a thermoplastic adhesive material selected from the group consisting of polyesters, polyvinyl acetals, polyamides, butadiene-acrylonitrile copolymers, styrene-butadiene copolymers, styrene-isoprene copolymers, styrene-ethylene-butylene copolymers, ethylene-vinyl acetate copolymers, ethylene-ethyl acrylate copolymers, ethylene propylene diene monomer and mixtures thereof.

The composition after application to the parts to be bonded or sealed forms a thermoset bond or seal on application of heat thereto, preferably by electromagnetic techniques including dielectric and induction heating.

3 Claims, No Drawings

HEAT ACTIVATABLE ADHESIVE OR SEALANT COMPOSITIONS

BACKGROUND OF THE INVENTION

1. Field of the Invention

This invention relates to thermoplastic adhesive and sealing organic resin compositions which, on application of heat, preferably in an accelerated manner, crosslink to give a thermoset bond or seal.

The invention also relates to a process for forming a crosslinked bond or seal.

2. Description of the Prior Art

The concept of thermosetting or crosslinking resin adhesives is known in the art. Many resin adhesives which undergo an irreversible chemical and physical change and become substantially insoluble are well known. Thermosetting adhesives comprising both condensation polymers and addition polymers are also known and examples include the urea-formaldehyde, phenol-formaldehyde and melamine-formaldehyde adhesives; epoxy, unsaturated polyester and polyurethane adhesives. U.S. Pat. No. 4,122,073 teaches thermosetting resin obtained from polyisocyanates, polyanhydrides and polyepoxides. Crosslinking in these patents is achieved by reaction with available sites in the base polymers. U.S. Pat. No. 4,137,364 teaches crosslinking of an ethylene/vinyl acetate/vinyl alcohol terpolymer using isophthaloyl biscaprolactam or vinyl triethoxy silane whereby crosslinking is achieved before heat activation with additional crosslinking induced by heat after application of the adhesive. U.S. Pat. No. 4,116,937 teaches a further method of thermal crosslinking by the use of polyamino bis-maleimide class of flexible polyimides, which compounds can be hot melt extruded up to 150° C. and undergo crosslinking at elevated temperatures thereabove. In these latter two patents, thermocrosslinking is also achieved by reactions of the particular crosslinking agent with available sites of the base polymers.

U.S. Pat. No. 4,352,723 is directed to dual UV and heat activated compositions comprising (1) a liquid, ethylenically unsaturated monomer, oligomer or prepolymer of the formula:

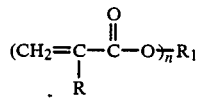

wherein R is H or $CH_3$, $R_1$ is an organic moiety and n is 2 to 4, hereinafter referred to as the ethylenically unsaturated compound, (2) a photoinitiator, and (3) a substituted or unsubstituted pinacol. The exposure to UV radiation and heat in seriation or simultaneously results in a cured solid product. U.S. Pat. No. 4,348,515 relates to a heat curing process and to heat activated compositions complrising (1) an ethylenically unsaturated compound containing at least two carbon-to-carbon double bonds and (2) a thiuram. However, as is well known, these acrylate materials set out in these latter two patents when cured are brittle and thus have poor flexibility. U.S. Pat. No. 4,374,963 relates to a heat curable composition comprising (a) a liquid, ethylenically unsaturated monomer, oligomer or prepolymer of the formula:

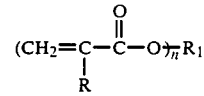

wherein R is H or $CH_3$, $R_1$ is an organic moiety and n is at least 2, (b) an epoxy resin containing at least two

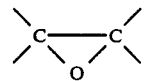

groups, and (c) a thermal initiator member of the group consisting of (1) a substituted or unsubstituted diaryliodonium salt in combination with a free radical initiator, (2) a $BF_3$ adduct, (3) A $BF_3$ adduct in combination with a free radical initiator, and (4) dicyandiamide in combination with a free radical initiator. This system has improved flexibility but requires coinitiators to cure the different curable materials.

In substantially all of these thermosetting adhesives bond formation is dependent on the chemical crosslinking reaction which in most cases is accelerated by means of heat to obtain the bond within a reasonable period of time. Further, in many cases, two or more components must be admixed just prior to the preparation of the bond. This necessitates a fast application since the crosslinking reaction begins immediately upon admixture and is irreversible. Thus, there has been a desire for a one part thermosetting adhesive which can be applied and thereafter triggered to cure on command.

Methods of achieving delayed tack are known in the art. See U.S. Pat. Nos. 2,653,880, 2,653,881 and 4,059,715 which teach the employment of thermoplastic polymers containing slowly crystallizing segments.

On the other hand, thermoplastic adhesives, which are used in the form of solutions, dispersions or solids, usually bond by purely physical means. Probably the most important means of applying thermoplastic adhesives is the hot melt method wherein bond formation occurs when the polymer melt solidifies in position between adherends. The bonds obtained by this method reach their final strength faster than those obtained from solution type adhesives. Obviously, the thermal stability of the thermoplastic resin determines its potential usefulness as a hot melt adhesive. In order for the thermoplastic to be used as a hot melt, it must also have a low melt viscosity, thus permitting application of the adhesive to the adherends at acceptable rates. Usually this means the polymer must have a low molecular weight. However, many thermoplastic materials cannot be employed as hot melts because they do not have sufficient cohesive strength at the low molecular weights required for application to a substrate. For example, the low molecular weight polyolefins, especially low molecular weight, low density polyethylene, are widely used in hot melt adhesives for sealing corrugated cartons, multi-wall bag seaming and the like, but they do not have sufficient strength to be used in structural applications such as plywood manufacture. Further, they do not have sufficient heat resistance to be used for bonding components which are intermittently exposed to elevated temperatures such as under the hood automotive applications. That is, thermoplastic adhesives cannot be employed where the adhesive in situ is reexposed to elevated temperatures which will cause the adhesive to sag thereby allowing the bond to break.

In the prior art there are many two-part materials which are cured in situ at elevated temperature, e.g., epoxy and urethane resins. The curing times, however, are relatively long, thereby precluding on-line production in a continuous operation. The curing time can be substantially reduced by heating, but such methods are rarely used due to the fact that external heating also causes substrate or adherends to be heated. In the case of heat sensitive substrates and adherends, e.g., thermoplastics, it can cause damage or distortion thereof.

OBJECTS OF THE INVENTION

One object of the instant invention is to produce a one part adhesive composition which is solventless. Another object of the invention is to produce an adhesive composition which can be applied as a hot melt. Still another object of the instant invention is to produce an adhesive composition which is heat curable in a minimum time period. Yet another object of the invention is to produce a process whereby an adhesive composition can be applied as a hot melt and thereafter cured by a thermally triggered initiator to a thermoset adhesive at a more elevated temperature. Another objective is to provide a one part adhesive composition that can be applied as a free film, tape or as a preformed gasket. Other objects will become apparent from a reading hereinafter.

DESCRIPTION OF THE INVENTION

The present invention relates to a heat activatable adhesive composition comprising (1) a liquid, ethylenically unsaturated monomer, oligomer or prepolymer of the formula:

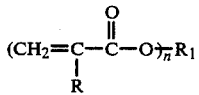

wherein R is H or $CH_3$, $R_1$ is an organic moiety and n is at least 2, (2) a thermal initiator selected from the group consisting of substituted or unsubstituted pinacols, azo compounds, thiurams, organic peroxides and mixtures thereof, and (3) a thermoplastic adhesive material selected from the group consisting of polyesters, polyvinyl acetals, polyamides, butadiene-acrylonitrile copolymers, styrene-butadiene copolymers, styrene-isoprene copolymers, styrene-ethylene-butylene copolymers, ethylene-vinyl acetate copolymers, ethylene-ethyl acrylate copolymers, ethylene propylene diene monomer and mixtures thereof.

The composition after application to the parts to be bonded or sealed forms a thermoset bond or seal on application of heat thereto, preferably by electromagnetic heating techniques including dielectric and induction heating. Although the composition and process taught herein is operable to form a thermoset bond or seal, the invention for the most part for reasons of brevity will be explained in terms of adhesive bonding.

The liquid ethylenically unsaturated monomer, oligomer or prepolymer, i.e., the acrylate terminated polyene, of the formula:

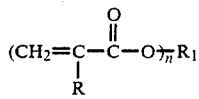

wherein R is H or $CH_3$, $R_1$ is an organic moiety and n is at least 2 of the composition herein, can be made by various reactants and methods. One of these acrylate terminated materials is a polyether polyol urethane polyacrylate formed by reacting a polyether polyol with a polyisocyanate and end-capping with a hydroxyalkyl acrylate. Another material may be a polyester polyol urethane polyacrylate formed by reacting a polyester polyol with a polyisocyanate and end-capping with a hydroxyalkyl acrylate. Still another material in this category is an epoxy acrylate formed by reacting a diepoxide with acrylic acid. Yet another acrylate terminated material operable herein is a polyether or a polyester acrylate formed by end-capping a polyether polyol or polyester polyol with acrylic acid or acryoyl chloride. Yet another acrylate terminated material operable herein is a urethane polyacrylate formed by end-capping a diisocyanate with a hydroxyalkyl acrylate. As used herein, the term "acrylate" refers to both acrylates and methacrylates. Examples of acrylate terminated materials include, but are not limited to, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, trimethylolpropane triacrylate, di-trimethylol propane tetraacrylate, triacrylate of tris(hydroxyethyl)isocyanate, dipentaerythritol hydroxypenta acrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethyacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate and pentaerythritol diacrylate.

The thermal initiators used herein for curing the ethylenically unsaturated containing group member of the composition are free radical initiators selected from substituted or unsubstituted pinacols, azo compounds, thiurams, organic peroxides and mixtures thereof.

The organic peroxides operable are of the general formula:

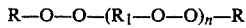

wherein n=0 or 1, R is independently selected from hydrogen, aryl, alkyl, aryl carbonyl, alkaryl carbonyl, aralkyl carbonyl and alkyl carbonyl and $R_1$ is alkyl or aryl, said alkyl groups containing 1 to 20 carbon atoms.

Examples of operable organic peroxides include, but are not limited to 2,5-dimethyl-2,5-di(t-butylperoxy)-hexane, 1,3-bis(t-butylperoxyisopropyl)benzene, 1,3-bis(cumylperoxyisopropyl)benzene, 2,4-dichlorobenzoyl peroxide, caprylyl peroxide, lauroyl peroxide, t- butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane, di-t-butyl peroxide and t-butyl hydroperoxide.

The organic peroxide is added to the composition in an amount ranging from 0.01–10%, preferably 0.1–5%, by weight based on the weight of the ethylenically unsaturated group member.

Examples of azo compounds operable herein include, but are not limited to, commercially available compounds such as 2-t-butylazo-2-cyanopropane; 2,2'-azobis-(2,4-dimethyl-4-methoxy-valeronitrile); 2,2'-azobis-(isobutyronitrile); 2,2'-azobis(2,4-dimethylvaleronitrile) and 1,1'-azobis-(cyclohexanecarbonitrile).

The azo compound is added to the composition in an amount ranging from 0.001–5%, preferably 0.01–2% by weight based on the weight of the ethylenically unsaturated group member.

The thiurams operable as thermal initiators herein are of the formula

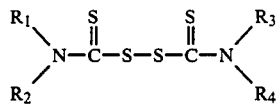

wherein $R_1$, $R_2$, $R_3$ and $R_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, $R_1$ and $R_2$ and $R_3$ and $R_4$ can each be a divalent alkylene group ($-C_nH_{2n}-$) having from 2 to about 12 carbon atoms, a divalent alkenylene group $-(C_nH_{2n-2})-$ having from 3 to about 10 carbon atoms, a divalent alkadienylene group $-(C_nH_{2n-4})-$ having from 5 to about 10 carbon atoms, a divalent alkatrienylene group $-(C_nH_{2n-6})-$ having from 5 to about 10 carbon atoms, a divalent alkylene-oxyalkylene group ($-C_xH_{2x}-OC_xH_{2x}-$) having a total of from 4 to about 12 carbon atoms or a divalent alkyleneaminoalkylene group

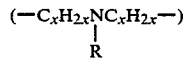

having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide and diethyleneoxythiuram disulfide and the like.

The thiuram is added to the composition in an amount ranging from 0.005–5.0% by weight of the ethylenically unsaturated group member.

The substituted or unsubstituted pinacols operable herein as a thermal initiator have the general formula:

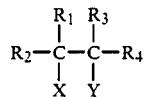

wherein $R_1$ and $R_3$ are the same or different substituted or unsubstituted aromatic radicals, $R_2$ and $R_4$ are substituted or unsubstituted aliphatic or aromatic radicals and X and Y which may be the same or different are hydroxyl, alkoxy or aryloxy.

Preferred pinacols are those wherein $R_1$, $R_2$, $R_3$ and $R_4$ are aromatic radicals, especially phenyl radical and X and Y are hydroxyl.

Examples of this class of compounds include, but are not limited to, benzopinacol, 4,4'-dichlorobenzopinacol, 4,4'-dibromobenzopinacol, 4,4'-diiodobenzopinacol, 4,4',4'', 4'''-tetrachlorobenzopinacol, 2,4-2',4'-tetrachlorobenzopinacol, benzopinacol, 4,4'-dimethylbenzopinacol, 3,3'-dimethylbenzopinacol, 2,2'-dimethylbenzopinacol, 3,4-3',4'-tetramethylbenzopinacol, 4,4'-dimethoxybenzopinacol, 4,4',4'',4'''-tetrametnoxyoenzopinacol, 4,4'-diphenylbenzopinacol, 4,4'-dichloro-4'',4'''-dimethylbenzopinacol, 4,4'-dimethyl-4'',4'''-diphenylbenzopinacol, xanthonpinacol, fluorenonepinacol, acetophenonepinacol, 4,4'-dimethylacetophenonepinacol, 4,4'-dichloroacetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenonepinacol, 2,2'-ethyl-3,3'-dimethoxypropiophenone-pinacol, 1,1,1,4,4,4-hexafluoro-2,3-diphenyl-butane-2,3-diol.

As further compounds according to the present invention, there may be mentioned: benzopinacol-mono methylether, benzopinacol-mono-phenylether, benzopinacol and monoisopropyl ether, benzopinacol monoisobutyl ether, benzopinacol mono (diethoxy methyl) ether and the like.

The pinacol is added to the composition in amounts ranging from 0.01–10%, preferably 0.1–5%, by weight based on the weight of the ethylenically unsaturated group member.

The thermal initiator can be added to the system in various ways. That is, the thermal initiator, per se, can be admixed with the ethylenically unsaturated member. Furthermore, the thermal initiator can be dissolved or suspended in well known commercially available solvents such as dibutyl phthalate; ketones, e. g., acetone and methylethyl ketone or chlorinated hydrocarbons such as methylene chloride, and then added to the system.

The thermoplastic adhesive material component of the heat activatable adhesive organic resin composition can be made up of various saturated and unsaturated thermoplastic polymers and copolymers, the term "copolymers" including terpolymers, tetrapolymers, etc.

These thermoplastic adhesive materials along with the remainder of the organic resin composition can be applied in hot melt form as a one part adhesive. These thermoplastic adhesive materials are composed of 100% non-volatile materials, i. e., containing no water, solvent or other volatile carriers. They are solid, pasty or liquid at room temperature but become more fluid at elevated temperatures, thereby allowing for easy application. The thermoplastic adhesive materials operable herein include, but are not limited to, polyamides, polyvinyl acetals and polyester resins, ethylene-vinyl acetate (EVA) copolymers, ethylene-ethyl acrylate (EEA) copolymers, butadiene-acrylonitrile copolymers and styrene-ethylene-butylene copolymers. Some of the newer materials of the more conventional "rubber" variety are the block copolymers, styrene-butadiene or styrene-isoprene sold under the tradename "Kraton". These thermoplastic adhesive materials are sometimes used in conjunction with secondary components including waxes, plasticizers, reactive diluents, fillers and antioxidants. Wax functions as a non-volatile solvent for the thermoplastic adhesive material and reduces melt viscosity. Plasticizers, reactive diluents or liquid modifiers are used to a limited extent to formulate flexibility, specific wetting and viscosity characteristics into hot melt compounds. Fillers are used for cost reduction, color control and to improve cohesive properties. Antioxidants are used to retard oxidation during compounding and application.

One thermoplastic adhesive material useful in the adhesive compositions of the present invention includes those thermoplastic segmented copolyesters disclosed in U.S. Pat. No. 4,059,715, incorporated herein by reference. Another particularly suitable thermoplastic copolyester comprises radicals of adipic acid, a $C_{36}$ dimer acid formed from linoleic acid (available under the trade designation "EMPOL 1010" from Emery Industries), 1,4-cyclohexane dimethanol and a poly(oxytetramethylene) glycol having a molecular weight of 2,000 and a hydroxyl equivalent of approximately 56 (available under the trade designation "Polymeg 2000" from E. I. DuPont Co.).

Other thermoplastic adhesive materials which are useful in the adhesive compositions of the present invention include other thermoplastic polyesters (e. g., that available under the trade designation "5096" from Cooper Polymers, Inc.), thermoplastic polyurethanes (e. g., that available under the trade designation "Q-thane PH 56" from K. J. Quinn Co., Inc.), thermoplastic polyamides (e. g., that available under the trade designation "Coramid 2430" from Cooper Polymers, Inc.), "Elvamides" available from DuPont and "Macromelt" available from Henkel; thermoplastic rubbers (e. g., those available under the trade designation "Kraton 1101" and "Kraton 1107" from Shell Chemical Co.) and ethylene vinylacetate (e. g., that available under the trade designation "Elvax-40" from E. I. DuPont de Nemours Co., Inc. and "Ultrathene" available from USI). Still other thermoplastic adhesive materials operable as a component in the adhesive organic resin composition include, but are not limited to, butydiene-acrylonitrile copolymers available under the trade designation "Hycar" from B. F. Goodrich, urethane-acrylates, urethane-epoxides and urethane-polyenes. In addition, other thermoplastic materials are polyvinyl acetals such as polyvinyl formal and polyvinyl butyral. The thermoplastic adhesive material is present in the composition in amounts ranging from 1–95% by weight of the composition with the balance being the ethylenically unsaturated monomer, oligomer or prepolymer material.

In the instances where the thermoplastic adhesive material contains ethylenic unsaturation, e. g., styrene-butadiene copolymers and ethylene propylene diene monomer, it is possible for cocuring with the ethylenically unsaturated material to occur on heating. When the thermoplastic adhesive material is void of such groups, it merely acts as a matrix for the crosslinkable ethylenically unsaturated material and provides additional adhesive and flexibility properties.

The compositions of the present invention may, if desired, include such conventional additives as antioxidants, inhibitors, fillers, antistatic agents, flame-retardant agents, thickeners, thixotropic agents, surface-active agents, viscosity modifiers, plasticizers, tackifiers and the like within the scope of this invention. Such additives are usually preblended with the ethylenically unsaturated compound prior to or during the compounding step. Operable fillers which can be added to the system to reduce cost include natural and synthetic resins, glass fibers, wood flour, clay, silica, alumina, carbonates, oxides, hydroxides, silicates, glass flakes, borates, phosphates, diatomaceous earth, talc, kaolin, barium sulfate, calcium sulfate, calcium carbonate, wollastonite, carbon fibers and the like. The aforesaid additives may be present in quantities up to 500 parts or more per 100 parts of the organic resin composition by weight and preferably about 0.005 to about 300 parts on the same basis.

Additionally, scavengers and antioxidants such as hydroquinone, pyragallol, phosphorous acid, triphenyl phosphine, tert-butyl hydroquinone, tert-butyl catechol, p-benzoquinone, 2,5-diphenylbenzo-quinone, 2,6-di-tert-butyl-p-cresol, etc., are added to the system in conventional amounts ranging from 0.001 to 2.0% by weight of the ethylenically unsaturated member.

The heating step is usually carried out for a period of 1 second to 30 minutes at a temperature of 70°–200° C., preferably 90°–170° C. which is sufficient to fully cure the composition to a solid thermoset adhesive or sealant product.

The heating step using a thermal initiator to cure the adhesive organic resin composition can be accomplished in several ways. In simple stystems, the adhesive composition can be applied by manual means to an adherend, contacted with another adherend and the assembled system heated in an air oven until a thermoset bond results.

Additionally and preferably, electromagnetic heating can be utilized as a faster and more efficient means of curing, especially where the substrates to be bonded are plastic materials. In addition to the formation of high strength bonds, electromagnetic bonding techniques aid in (a) fast bond setting times, and (b) automated part handling and assembly.

In practicing the instant invention, electromagnetic heating can be employed with the adhesive composition herein to adhere (1) plastic to plastic, (2) plastic to metal and (3) metal to metal. For example, dielectric heating can be used to bond (1) and (2) supra if the adhesive composition contains sufficient polar groups to heat the composition rapidly and allow it to bond the adherends. Inductive heating can also be used to bond (1), (2) and (3). That is, when at least one of the adherends is an electrically conductive or ferromagnetic metal, the heat generated therein is conveyed by conductance to the adhesive composition thereby initiating the cure to form a thermoset adhesive. In the instance where both adherends are plastic, it is necessary to add an energy absorbing material, i. e., an electrically conductive or ferromagnetic material, preferably in fiber or particle form (10-400 mesh) to the adhesive composition. The energy absorbing material is usually added in amounts ranging from 0.1 to 2 parts by weight, per 1 part by weight of the adhesive organic resin composition. It is also possible to impregnate the plastic adherend at the bonding joint with particles of the energy absorbing material in order to use inductive heating, but care must be exercised that the plastic is not distorted.

The particulate electromagnetic energy absorbing material used in the adhesive composition when induction heating is employed can be one of the magnetizable metals including iron, cobalt and nickel or magnetizable alloys or oxides of nickel and iron and nickel and chromium and iron oxide. These metals and alloys have high Curie points (730°–2,040° F).

Electrically conductive materials operable herein when inductive heating is employed include, but are not limited to, the noble metals, copper, aluminum, nickel, zinc as well as carbon black, graphite and inorganic oxides.

There are two forms of high frequency heating operable herein, the choice of which is determined by the material to be adhered. The major distinction is whether or not the material is a conductor or non-conductor of electrical current. If the material is a conductor, such as iron or steel, then the inductive method is used. If the material is an insulator, such as wood, paper, textiles, synthetic resins, rubber, etc., then dielectric heating can also be employed.

Most naturally occurring and synthetic polymers are non-conductors and, therefore, are suitable for dielectric heating. These polymers may contain a variety of dipoles and ions which orient in an electric field and rotate to maintain their alignment with the field when the field oscillates. The polar groups may be incorporated into the polymer backbone or can be pendant side groups, additives, extenders, pigments, etc. For example, as additives, lossy fillers such as carbon black at a one percent level can be used to increase the dielectric response of the adhesive. When the polarity of the electric field is reversed millions of times per second, the resulting high frequency of the polar units generates heat within the material.

The uniqueness of dielectric heating is in its uniformity, rapidity, specificity and efficiency. Most plastic heating processes such as conductive, convective or infrared heating are surface-heating processes which need to establish a temperature within the plastic and subsequently transfer the heat to the bulk of the plastic by conduction. Hence, heating of plastics by these methods is a relatively slow process with a non-uniform temperature resulting in overheating of the surfaces. By contrast, dielectric heating generates the heat within the material and is therefore uniform and rapid, eliminating the need for conductive heat transfer. In the dielectric heating system herein the electrical frequency of the electromagnetic field is in the range 1–3,000 megahertz, said field being generated from a power source of 0.5–1,000 kilowatts.

Induction heating is similar, but not identical, to dielectric heating. The following differences exist: (a) magnetic properties are substituted for dielectric properties; (b) a coil is employed to couple the load rather than electrodes or plates; and (c) induction heaters couple maximum current to the load. The generation of heat by induction operates through the rising and falling of a magnetic field around a conductor with each reversal of an alternating current source. The practical deployment of such field is generally accomplished by proper placement of a conductive coil. When another electrically conductive material is exposed to the field, induced current can be created. These induced currents can be in the form of random or "eddy" currents which result in the generation of heat. Materials which are both magnetizable and conductive generate heat more readily than materials which are only conductive. The heat generated as a result of the magnetic component is the result of hysteresis or work done in rotating magnetizable molecules and as a result of eddy current flow. Polyolefins and other plastics are neither magnetic nor conductive in their natural states. Therefore, they do not, in themselves, create heat as a result of induction.

The use of the eletromagnetic induction heating method for adhesive bonding of plastic structures has proved feasible by interposing selected eletromagnetic energy absorbing materials in an independent adhesive composition layer or gasket conforming to the surfaces to be bonded, electromagnetic energy passing through the adjacent plastic structures (free of such energy absorbing materials) is readily concentrated and absorbed in the adhesive composition by such energy absorbing materials thereby rapidly initiating cure of the adhesive composition to a thermoset adhesive.

Electromagnetic energy absorbing materials of various types have been used in the electromagnetic induction heating technique for some time. For instance, inorganic oxides and powdered metals have been incorporated in bond layers and subjected to electromagnetic radiation. In each instance, the type of energy source influences the selection of energy absorbing material. Where the energy absorbing material is comprised of finely divided particles having ferromagnetic properties and such particles are effectively insulated from each other by particle containing nonconducting matrix material, the heating effect is substantially confined to that resulting from the effects of hysteresis. Consequently, heating is limited to the "Curie" temperature of the ferromagnetic material or the temperature at which the magnetic properties of such material cease to exist.

The electromagnetic adhesive composition of this invention may take the form of an extruded ribbon or tape, a molded gasket or cast sheet or film. In liquid form it may be applied by brush to surfaces to be bonded or may be sprayed on or used as a dip coating for such surfaces.

The foregoing adhesive composition, when properly utilized as described hereinafter, results in a solvent free bonding system which permits the joining of metal or plastic items without costly surface pretreatment. The electromagnetically induced bonding reaction occurs rapidly and is adaptable to automated fabrication techniques and equipment.

To accomplish the establishment of a concentrated and specifically located heat zone by induction heating in the context of bonding in accordance with the invention, it has been found that the electromagnetic adhesive compositions described above can be activated and a bond created by an induction heating system operating with an electrical frequency of the electromagnetic field of from about 5 to about 30 megacycles and preferably from about 15 to 30 megacycles, said field being generated from a power source of from about 1 to about 30 kilowatts, and preferably from about 2 to about 5 kilowatts. The electromagnetic field is applied to the articles to be bonded for a period of time of less than about 2 minutes.

As heretofore mentioned, the electromagnetic induction bonding system and improved electromagnetic adhesive compositions of the present invention are applicable to the bonding of metals, thermoplastic and thermoset material, including fiber reinforced thermoset material.

The following examples are set out to explain, but expressly not limit, the instant invention. Unless otherwise noted, all parts and percentages are by weight.

Strength properties of adhesive in shear by tension loading were run in accord with ASTMD 1002-64 based on one inch square of lapped area.

The following examples in TABLE I show the strength properties of various heat activatable adhesive compositions in shear. In all the examples, the thermoplastic adhesive material was dissolved in a solvent, i. e., 50/50 MeOH/CH or $CH_2Cl_2$, at 40° C. followed by the dissolution of the ethylenically unsaturated group member. Next, the thermal initiator is dissolved in the solvent. The solvent was removed by vacuum and the remaining solid heat-activatable adhesive composition was applied between two adherends in a ½" lap. 5 sets of test samples were made up for each adhesive composition. The adherends were clamped together by binder clamps and placed in a forced air oven maintained at 160° C. for 20 minutes. The test samples were removed from the oven, unclamped and allowed to cool to room temperature before lap shear measurements (psi) were taken. The average of the five test values is shown in TABLE I.

TABLE I

| Example No. | Adhesive Thermoplastic Material Type | Wt. % | Acrylate Member (wt. %) TMOP-TA[b] | SR-209[c] | Initiator (wt. %) | Lap Shear, psi[a] Steel[d] | Fiberglass Reinforced Polyester |
|---|---|---|---|---|---|---|---|
| 1 | Butadiene-14% Acrylonitrile copolymer[e] | 100 | — | — | — | 65[f] | — |
| 2 | Butadiene-14% Acrylonitrile copolymer[e] | 79.84 | 19.96 | — | Benzopinacol, 0.2 | 113[f] | — |
| 3 | Styrene-Isoprene Copolymer[g] | 100 | — | — | — | 100[f] | — |
| 4 | Styrene-Isoprene Copolymer[g] | 79.84 | 19.96 | — | Benzopinacol, 0.2 | 185[f] | — |
| 5 | Polyvinyl formal[h] | 100 | — | — | — | 200 | — |
| 6 | Polyvinyl formal[h] | 89.11 | 9.90 | — | Benzopinacol, 0.99 | 450 | — |
| 7 | Polyvinyl butyral[i] | 100 | — | — | — | 720 | 600 |
| 8 | Polyvinyl butyral[i] | 89.11 | 9.90 | — | Benzopinacol, 0.99 | 2,100 | — |
| 9 | Polyvinyl butyral[i] | 89.82 | 9.98 | — | Azobisisobutyronitrile, 0.2 | — | 700 |
| 10 | Polyvinyl butyral[i] | 89.91 | 9.99 | — | Tetramethylthiuram disulfide, 0.1 | 1,080 | 800 |
| 11 | Ethylene-28% vinyl acetate copolymer[j] | 100 | — | — | — | 200 | 570 |
| 12 | Ethylene-28% vinyl acetate copolymer[j] | 74.81 | 24.94 | — | Benzopinacol, 0.25 | 1,000 | 1,120 |
| 13 | Ethylene-28% vinyl acetate copolymer[j] | 49.75 | — | 49.75 | Benzopinacol, 0.50 | — | 1,200 |
| 14 | Polyamide[k] | 100 | — | — | — | 1,200 | — |
| 15 | Polyamide[k] | 89.91 | — | 9.99 | Benzopinacol, 0.1 | 1,700 | — |
| 16 | Polyester[l] | 100 | — | — | — | 230 | — |
| 17 | Polyester[l] | 89.82 | 9.98 | — | Peroxide[m], 0.20 | 1,060 | — |

FOOTNOTES:
[a]Cured at 160° C. for 20 min., then lap shear measured at R.T., all laps ½ inch except where noted;
[b]TMOP-TA = Trimethylolpropane triacrylate;
[c]SR 209 = Sartomer tretraethylene glycol dimethacrylate, commercially available from Sartomer;
[d]All on as received steel, except where noted;
[e]Hycar 1041, commercially available from B. F. Goodrich;
[f]1 inch lap on degreased steel;
[g]Kraton 1107, commercially available from Shell Chemical;
[h]Formvar 5195E, average molecular weight 10,000 to 15,000, Monsanto;
[i]Butvar B-76, average molecular weight 45,000 to 55,000, Monsanto;
[j]Ultrathene 636-04, softening pt 106° C., commercially available from USI Chemicals;
[k]Macromelt 6900, softening point 130 to 150° C., Henkel Adhesives Co.;
[l]Dynapol S-142, softening point 99° C., Dynamit Nobel;
[m]1,1-di(t-butylperoxy)-3,3,5-trimethylcyclohexane, commercially available from Pennwalt.

The examples in TABLE II show the strength properties of various heat activatable adhesive compositions in shear when the heat cure is carried out using dielectric heating. The adhesive compositions were made up as in the examples in TABLE I, placed between adherends in a ½" lap and cured by radio frequency radiation at 200 volts and 0.8 ampere of direct current for 2 minutes.

TABLE II

RF Dielectric Curing of Adhesive Compositions

| Example No. | Adhesive Thermoplastic Material Type | Wt. % | Acrylate Member (wt. %) TMOP-TA[b] | Initiator (wt. %) | Lap Shear, psi[a] Fiberglass Reinforced Polyester |
|---|---|---|---|---|---|
| 18 | Polyamide[c] | 89.91 | 9.99 | Benzopinacol, 0.1 | 860 |
| 19 | Polyvinyl butyral[d] | 89.91 | 9.99 | Benzopinacol, 0.1 | 430 |
| 20 | Ethylene-vinyl acetate | 89.91 | 9.99 | Benzopinacol, 0.1 | 600 |

TABLE II-continued

| | RF Dielectric Curing of Adhesive Compositions | | | | |
|---|---|---|---|---|---|
| Example No. | Adhesive Thermoplastic Material Type | Wt. % | Acrylate Member (wt. %) TMOP-TA[b] | Initiator (wt. %) | Lap Shear, psi[a] Fiberglass Reinforced Polyester |
| | copolymer[e] | | | | |

FOOTNOTES:
[a]Cured 2 minutes, ¼" laps;
[b]TMOP-TA = Trimethylolpropane triacrylate;
[c]Macromelt-6900, Henkel Adhesive Co.;
[d]Butvar B-76, Monsanto;
[e]Ultrathene 636-04, USI Chemicals Co.

The examples in TABLE III show strength properties of various compositions in shear when the curing step is performed using inductive heating. The adhesive compositions were made up as in the examples in TABLE I with the iron filler used herein being added at the end with stirring. After placing the adhesive between adherends in a 1/" lap, curing was carried out on a 2kw EMABond generator Model EA-20 at 95–100% load for 2 minutes.

TABLE III

| | RF Inductive Curing of Adhesive Compositions | | | | | |
|---|---|---|---|---|---|---|
| Example No. | Adhesive Thermoplastic Material Type | wt. % | Wt. % from Filler[a] | Acrylate Member (wt. %) TMOP-TA[c] | Initiator (wt. %) | Lap Shear psi[b] Fiberglass Reinforced Polyester |
| 21 | Polyamide[d] | 58.37 | 35.02 | 6.49 | Benzopinacol, .13 | 870 |
| 22 | Ethylene-vinyl acetate copolymer[e] | 58.37 | 35.02 | 6.49 | Benzopinacol, .13 | 625 |
| 23 | Polyvinyl butyral[f] | 58.37 | 35.02 | 6.49 | Benzopinacol, .13 | 790 |

FOOTNOTES:
[a]Iron powder 300 mesh
[b]Cured 2 minutes, ¼" laps;
[c]TMOP-TA = Trimethylolpropane triacrylate;
[d]Macromelt-6900, Henkel Adhesives Co.;
[e]Ultrathene 636-04, USI Chemicals;
[f]Butvar B-76, Monsanto.

The compositions herein for the most part are solids at room temperature which can be used as reactive hot melt adhesives. That is, the solid composition can be heated to a molten or plastic mass at a temperature below the decomposition temperature of the thermal initiator and be placed between 2 substrates to be adhered. Upon cooling to a lower temperature the adhesive solidifies to a thermoplastic adhesive with properties sufficient to adhere the substrates. Thereafter, the assembled works can be heated to a higher temperature to trigger the thermal initiator and form a thermoset adhesive between the substrates. A further refinement can be the use of the solid composition in the form of film, tape or gasket to be placed between adherends.

We claim:

1. A heat activatable adhesive or sealant organic resin composition consisting of
   (1) a liquid, ethylenically unsaturated monomer, oligomer or prepolymer of the formula:

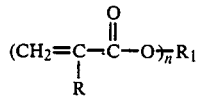

wherein R is H or CH$_3$, R$_1$ is an organic moiety and n is at least 2,
   (2) a thermal initiator selected from the group consisting of substituted or unsubstituted pinacols, azo compounds, organic peroxides and mixtures thereof, and
   (3) a thermoplastic adhesive material selected from the group consisting of polyvinyl acetals, polyamides, butadiene-acrylonitrile copolymers, styrene-butadiene copolymers, styrene-isoprene copolymers, styrene-ethylene-butylene copolymers, ethylene-vinyl acetate copolymers, ethylene-ethyl acrylate copolymers, ethylene propylene diene monomer and mixtures thereof.

2. The composition according to claim 1 wherein the composition is a solid in the form of a film, tape or gasket.

3. A heat activatable adhesive or sealant organic resin composition consisting of
   (1) a liquid, ethylenically unsaturated monomer, oligomer or prepolymer of the formula:

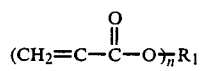

wherein R is H or CH$_3$, R$_1$ is an organic moiety and n is at least 2,
   (2) a thermal initiator selected from the group consisting of substituted or unsubstituted pinacols, azo compounds, organic peroxides nad mixtures thereof, and
   (3) a thermoplastic adhesive material consisting of polyvinyl acetal.

* * * * *